US012358731B2

(12) United States Patent
Frisch (10) Patent No.: US 12,358,731 B2
(45) Date of Patent: Jul. 15, 2025

(54) FEEDER (71) Applicant: SPRINGER MASCHINENFABRIK GMBH, Friesach (AT)

(72) Inventor: Clemens Frisch, Neumarkt in der Steiermark (AT)

(73) Assignee: SPRINGER MASCHINENFABRIK GMBH, Friesach (AT)

( * ) Notice: Subject to any disclaimer, the term of this patent is extended or adjusted under 35 U.S.C. 154(b) by 0 days.

(21) Appl. No.: 18/873,801

(22) PCT Filed: Jun. 2, 2023

(86) PCT No.: PCT/EP2023/064824
§ 371 (c)(1),
(2) Date: Dec. 11, 2024

(87) PCT Pub. No.: WO2023/241949
PCT Pub. Date: Dec. 21, 2023

(65) Prior Publication Data
US 2025/0162816 A1 May 22, 2025

(30) Foreign Application Priority Data
Jun. 15, 2022 (AT) .................. 50426/2022

(51) Int. Cl.
*B65G 47/86* (2006.01)
*B65G 47/69* (2006.01)
(52) U.S. Cl.
CPC ........... *B65G 47/69* (2013.01); *B65G 47/847* (2013.01)

(58) Field of Classification Search
CPC .................................................. B65G 47/847
(Continued)

(56) References Cited

U.S. PATENT DOCUMENTS 2,609,946 A * 9/1952 Brager ................. B65G 47/846
198/443
4,515,196 A 5/1985 Shields
(Continued)

FOREIGN PATENT DOCUMENTS

WO 2020014790 A1 1/2020

OTHER PUBLICATIONS

International Application No. PCT/EP2023/064824, International Search Report and Written Opinion mailed Sep. 15, 2023, 15 pages.
(Continued)

Primary Examiner — Gene O Crawford
Assistant Examiner — Lester Rushin, III
(74) Attorney, Agent, or Firm — Liang & Hennessey LLP; Brian Hennessey (57) ABSTRACT A feeder for feeding sawn wood pieces from an accumulating conveyor to a drag conveyor. The feeder includes at least one wheel having an axis of rotation and at least one control device and at least one first clamping element and at least one second clamping element are fastened to the wheel. The feeder is designed to clamp a sawn wood piece in place in a conveying region between the first and the second clamping element during a rotation of the wheel and to transport it in a clamped state along the conveying region. The control device is designed to control the first clamping element independently of the second clamping element.

19 Claims, 4 Drawing Sheets (58) Field of Classification Search
USPC .......................................................... 198/443
See application file for complete search history.

(56) References Cited

U.S. PATENT DOCUMENTS

| | | | | |
|---|---|---|---|---|
| 4,526,270 | A * | 7/1985 | Dichter | C03B 23/114 198/470.1 |
| 4,925,007 | A * | 5/1990 | Gerst | H01R 43/20 198/470.1 |
| 5,632,589 | A * | 5/1997 | Bray | B61C 11/04 198/349.6 |
| 5,752,594 | A | 5/1998 | Fournier | |
| 5,921,376 | A | 7/1999 | Michell et al. | |
| 5,931,287 | A | 8/1999 | Fournier | |
| 2015/0353296 | A1 | 12/2015 | Petryshen et al. | |
| 2018/0086568 | A1 | 3/2018 | Lepage et al. | |
| 2021/0261353 | A1 * | 8/2021 | Gravel | B65G 47/847 |

OTHER PUBLICATIONS

International Application No. PCT/EP2023/064824, International Preliminary Report on Patentability mailed Sep. 10, 2024, 29 pages.

* cited by examiner

FEEDER

CROSS-REFERENCE TO RELATED APPLICATIONS

The present application is a national phase application of PCT Application No. PCT/EP2023/064824, filed Jun. 2, 2023, entitled "FEEDER", which claims the benefit of Austrian Patent Application No. A 50426/2022, filed Jun. 15, 2022, each of which is incorporated by reference in its entirety.

BACKGROUND OF THE INVENTION

1. Field of the Invention

The invention relates to a feeder for feeding sawn wood pieces from an accumulating conveyor to a drag conveyor.

2. Description of the Related Art

It is known that, in wood processing, sawn wood pieces are transferred from an asynchronous conveying system to a synchronous conveying system. The unsynchronized sawn wood pieces are usually piled up and taken away individually by the feeder. Typically, the feeder transfers the individual sawn wood pieces to a drag conveyor, with one sawn wood piece being transferred to each flight.

One drawback of the currently known feeders is that if sawn wood pieces are not fed as intended, the sawn wood pieces have to be pushed back counter to the conveying direction of the feeder, resulting in disorder among the accumulated boards. Furthermore, currently known feeders are designed for a specific size of sawn wood pieces, so that if sawn wood pieces with a size other than the set size are to be fed, feeding is only possible to a limited extent or not at all without modifying the feeder. Another drawback of the currently known feeders is that they often cannot accelerate the sawn wood pieces sufficiently in order to enable the sawn wood pieces to be transferred directly to a drag conveyor. As a result, an additional acceleration conveyor is often used which is arranged between the feeder and the drag conveyor in order to accelerate the sawn wood pieces to the speed of the drag conveyor.

SUMMARY OF THE INVENTION

It is therefore the object of the invention to provide a feeder of the type mentioned at the outset with which the drawbacks mentioned can be avoided, with which controlled feeding of sawn wood pieces of different thicknesses can be achieved, and with which disorder among the sawn wood pieces can be avoided if they are not fed.

According to the invention, this is achieved by the features of the claims.

This provides the advantage that, when clamping a sawn wood piece that is in the stowed position, the clamping process can be individually adapted to the thickness of the sawn wood piece. This also reduces surface damage to the sawn wood pieces, so that sawn wood pieces with different thicknesses and widths can be transferred from an asynchronous conveyor to a synchronized conveyor in a controlled and gentle manner without any modifications to the feeder. By controlling the first clamping element independently of the second clamping element, disorder among the accumulated sawn wood pieces can be avoided if sawn wood pieces are not fed, since the sawn wood pieces can be easily and quickly controlled so as to remain in the stowed position by means of the control device. This means that if the sawn wood pieces are not fed, they can remain in the stowed position and do not have to be pushed back counter to the conveying direction. Furthermore, by independently controlling the first and second clamping elements by the control device, a clamping movement which is carried out in order to clamp the sawn wood piece in place between the first and second clamping elements can be quickly and easily adapted to different dimensions of sawn wood pieces. This allows the sawn wood piece to be contacted with maximum simultaneity by the two clamping elements, which prevents any disorder when clamping the sawn wood piece and hence also of other sawn wood pieces that are in the stowed position. This creates an efficient and low-maintenance feeder with which sawn wood pieces can be transferred from an asynchronous conveyor to a synchronous conveyor in a controlled manner, even at a high cycle rate.

The invention further relates to a method according to the claims.

The invention therefore has the further object of specifying a method of the type mentioned at the outset with which the drawbacks mentioned can be avoided, with which controlled feeding of sawn wood pieces of different thicknesses can be achieved, and with which jamming among the sawn wood pieces can be avoided if they are not fed.

The advantages of the method correspond to the advantages of the abovementioned feeder.

The subclaims relate to additional advantageous embodiments of the invention. Express reference is hereby made to the wording of the patent claims, whereby the patent claims are incorporated into the description at this point by reference and considered to be reproduced verbatim.

BRIEF DESCRIPTION OF THE DRAWINGS

The invention will be described in greater detail with reference to the accompanying drawings, in which only preferred embodiments are shown by way of example. In the drawings.

DETAILED DESCRIPTION

FIGS. 1 to 7 show at least portions of a preferred embodiment of a feeder 1 for feeding sawn wood pieces 2 from an accumulating conveyor 3 to a drag conveyor 4, wherein the feeder 1 comprises at least one wheel 5 with an axis of rotation 6 and at least one control device, wherein at least one first clamping element 7 and at least one second clamping element 8 are fastened to the wheel 5, wherein the feeder 1 is designed to clamp a sawn wood piece 2 in place in a conveying region 9 between the first and the second clamping element 7, 8 when the wheel 5 rotates and to transport it in a clamped state along the conveying region 9, wherein the control device is designed to control the first clamping element 7 independently of the second clamping element 8.

Furthermore, a distribution system 15 comprising an accumulating conveyor 3 and a carrier conveyor 4 is provided, wherein the distributor 1 is arranged between the accumulating conveyor 3 and the carrier conveyor 4 in order to transport a sawn timber part 2 from the accumulating conveyor 3 to the carrier conveyor 4.

Furthermore, a method is provided for feeding sawn wood pieces 2 from an accumulating conveyor 3 to a drag conveyor 4 with a feeder 1, wherein the feeder 1 comprises at least one wheel 5 with an axis of rotation 6 and at least one control device, wherein at least one first clamping element 7 and at least one second clamping element 8 are fastened to the wheel 5, wherein, when the wheel 5 rotates, a sawn wood piece 2 is clamped in place in a pick-up region of a conveyor region 9 between the first clamping element 7 and the second clamping element 8 and is transported in a clamped state along the conveyor region 9, wherein the first clamping element 7 is controlled independently of the second clamping element 8 by the control device.

This provides the advantage that, when clamping a sawn wood piece 2 that is in the stowed position, the clamping process can be individually adapted to the thickness of the sawn wood piece 2. This also reduces surface damage to the sawn wood pieces 2, so that sawn wood pieces 2 with different thicknesses and widths can be transferred from an asynchronous conveyor to a synchronized conveyor in a controlled and gentle manner without any modifications to the feeder 1. By controlling the first clamping element 7 independently of the second clamping element 8, disorder among the accumulated sawn wood pieces 2 can be avoided if sawn wood pieces 2 are not fed, since the sawn wood pieces 2 can be easily and quickly controlled so as to remain in the stowed position by means of the control device. This means that if the sawn wood pieces 2 are not fed, they can remain in the stowed position and do not have to be pushed back counter to the conveying direction. Furthermore, by independently controlling the first and second clamping elements 7, 8 by the control device, a clamping movement, which is carried out in order to clamp the sawn wood piece 2 in place between the first and second clamping elements 7, 8, can be quickly and easily adapted to different dimensions of sawn wood pieces 2. In this way, the sawn wood piece 2 can be contacted with maximum simultaneity by the two clamping elements 7, 8, which prevents any disorder when clamping the sawn wood piece 2 and hence also of other sawn wood pieces 2 located in the stowed position. This creates an efficient and low-maintenance feeder 1 with which sawn wood pieces 2 can be transferred from an asynchronous conveyor to a synchronous conveyor in a controlled manner, even at a high cycle rate.

Preferably, the conveying region 9 extends from the accumulating conveyor 3 to the drag conveyor 4. Preferably, the conveying region 9 is the spatial region which is crossed by the sawn wood pieces 2 during transport or conveyance. FIG. 7 shows the section AA shown in FIG. 6 of a preferred embodiment of the feeding system 15; the arrangement of the accumulating conveyor 3, the feeder 1, and the drag conveyor 4 on the feeding system 15 is preferably shown and the conveying region 9 is visible.

Preferably, the conveying directions of the accumulating conveyor 3, the feeder 1, and the drag conveyor 4 are the same. The conveying direction is preferably the direction in which the sawn wood pieces 2 are conveyed or transported.

Preferably, the feeder 1 picks up the sawn wood piece 2 in the pick-up region of the conveying region 9. The pick-up region is in particular the region in which the sawn wood piece 2 is clamped in place by the feeder 1. Preferably, at least one sawn wood piece 2 is retained in the pick-up region of the accumulating conveyor 3.

Preferably, the pick-up region is arranged at a first end of the conveying region 9, and a delivery region of the conveying region 9 is arranged at a second end opposite the first end. Preferably, the delivery region is the region where the feeder 1 releases the clamped sawn wood piece 2.

Preferably, the sawn wood pieces 2 are accumulated by the accumulating conveyor 3. The sawn wood pieces 2 are preferably located in a stowed position on the accumulating conveyor 3. Preferably, the sawn wood pieces 2 are arranged in a row next to one another in the stowed position on the long sides of the sawn wood pieces 2.

Preferably, the accumulating conveyor 3 can be embodied as a conveyor belt and/or as a roller belt. Preferably, the sawn wood pieces 2 are transported up to a stop which is arranged in the conveying region 9, in particular in the pick-up region.

Preferably, the drag conveyor 4 can comprise a plurality of flights 16. Preferably, the feeder 1 feeds one sawn wood piece 2 per flight 16.

Preferably, a provision can be made that the accumulating conveyor 3 and/or the drag conveyor 4 and/or the feeder 1 are embodied as transverse conveyors. A cross conveyor is in particular a conveyor which transports a sawn wood piece 2 transversely to its longitudinal extent.

Preferably, a provision can be made that the feeding system 15 only comprises the accumulating conveyor 3, the feeder 1, and the drag conveyor 4.

Preferably, a provision can be made that the feeding system 15 comprises an acceleration conveyor arranged between the feeder 1 and the drag conveyor 4. Preferably, the acceleration conveyor can accelerate the sawn wood pieces 2 to a predeterminable speed.

A provision is made that the feeder 1 comprises at least one wheel 5 with an axis of rotation 6. The wheel 5 can be preferably embodied as a disc, in particular with recesses.

A provision is made that the feeder 1 comprises a first clamping element 7 and a second clamping element 8. The first and the second clamping element 7, 8 are fastened to the at least one wheel 5.

Preferably, the first clamping element 7 and/or the second clamping element 8 can be pivotably attached to the wheel 5.

Preferably, the feeder 1 can comprise two wheels 5 with a common axis of rotation 6.

Figure 6:
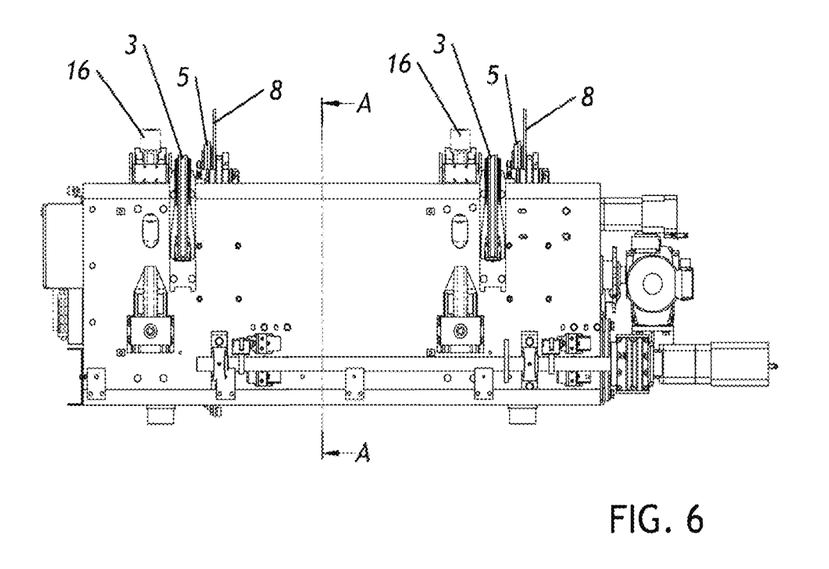
FIG. 6 shows a preferred embodiment of a feeding system.
Figure 7:
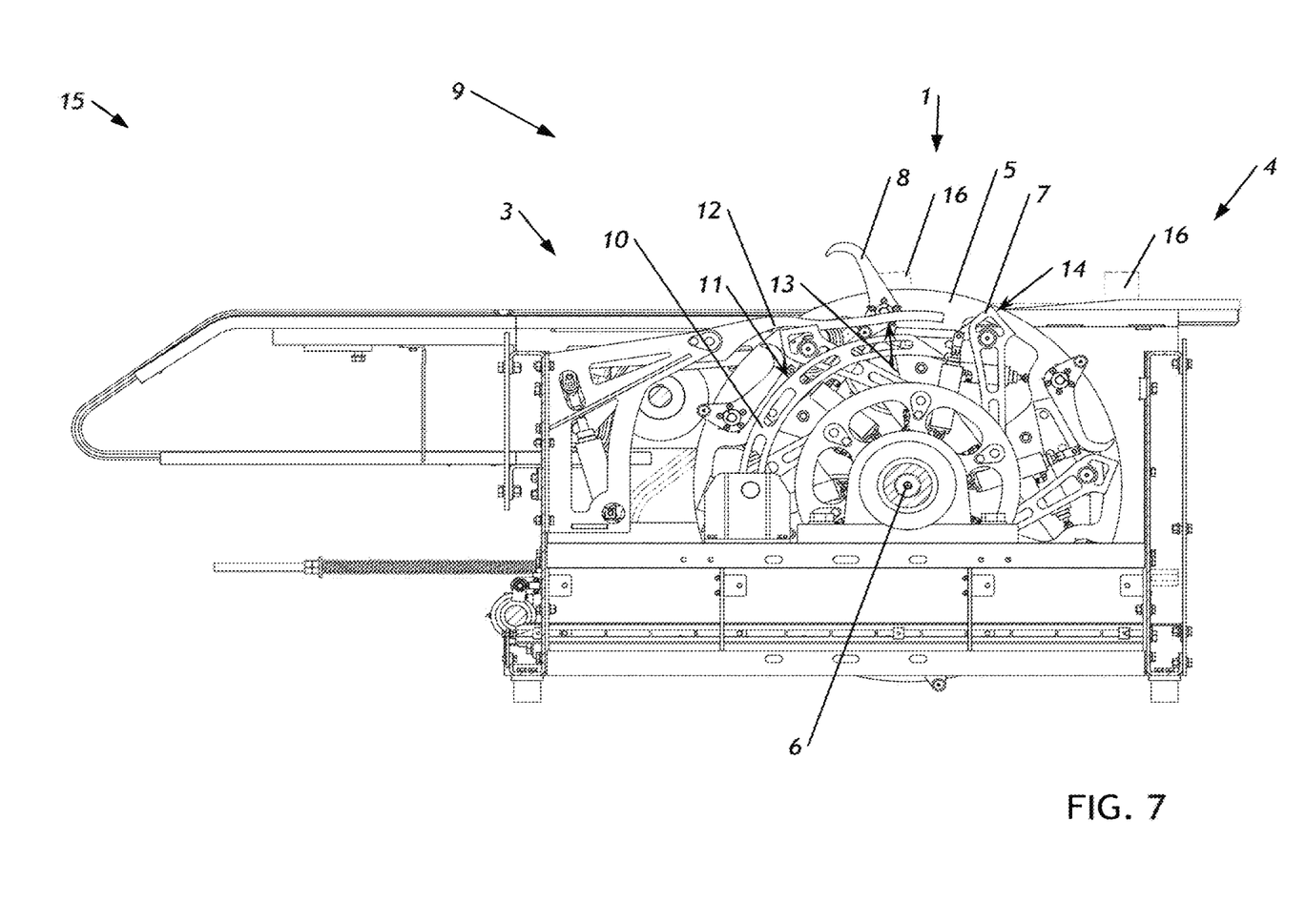
FIG. 7 shows the section along AA shown in FIG. 6 of the preferred embodiment of the feeding system.

By way of example, FIG. 6 shows the preferred embodiment of the feeding system 15 with two wheels 5 of similar type. Furthermore, FIG. 7 shows the section AA shown in FIG. 6, the wheels 5 shown in FIG. 6 having the same axis of rotation 6. Preferably, the two wheels 5 and the clamping elements 7, 8 attached to the wheels 5 can be of similar type. This offers the advantage that the two wheels 5 can be operated in a substantially synchronous manner, enabling the sawn wood piece 2 to be transferred to a cycle-bound conveying process in an especially controlled manner.

The feeder 1 is designed to clamp a sawn wood piece 2 in place between the first clamping element 7 and the second clamping element 8 and to hold it with the first clamping element 7 and the second clamping element 8. Preferably, the clamping of the sawn wood piece 2 is effected by the interaction of the first and the second clamping element 7, 8.

Preferably, the first clamping element 7 and the second clamping element 8 together form a clamping unit. Preferably, the clamping unit is designed to clamp a single sawn wood piece 2 in place, in particular between the first clamping element 7 and the second clamping element 8.

Preferably, the sawn wood piece 2 has a width, a thickness, and a length, the length being greater than the width and the thickness. Preferably, the sawn wood piece 2 can be a wood product which is produced by sawing round timber parallel to the trunk axis of the round timber. Preferably, the sawn wood piece 2 can have a thickness of at least 6 mm.

The feeder 1 is designed to transport the sawn wood piece 2 in the clamped state along the conveying region 9. Preferably, the sawn wood piece 2 is transported to the delivery region. Preferably, the sawn wood piece 2 is released from the clamped state by the feeder 1 in the delivery region.

A provision is made that the feeder 1 comprises at least one control device. The control device is designed to control the first clamping element 7 independently of the second clamping element 8. In FIGS. 6 and 7, the feeding system 15 with two wheels 5 is shown as an example, the wheels 5 and the parts interacting with the wheels 5 being of similar type. A provision can be preferably made that a separate control device is used for the first and second clamping elements 7, 8 attached to each wheel 5. The feeding system 15 shown as an example in FIG. 6 therefore comprises two control devices.

Preferably, a provision can be made that the control device comprises a first guide 10 with a first guideway 11 and that the first clamping element 7 for clamping the sawn wood piece 2 in the conveying region 9 is guided on the first guideway 11 in a first rotation range of the wheel 5. This offers the advantage that it can be easily and quickly governed whether feeding of sawn wood pieces 2 should be carried out or not by controlling the first guide 10. As a result, if the sawn wood pieces 2 are not fed, the sawn wood pieces 2 can remain in the stowed position without having to be pushed back counter to the conveying direction of the accumulating conveyor 3.

In FIGS. 1 to 5, at least portions of the preferred embodiment of the feeder 1 are shown in different positions, the first guide 10 with the first guideway 11 being visible. Furthermore, by comparing FIGS. 1 to 5, it is apparent how the first clamping element 7 for clamping the sawn wood piece 2 in the conveying region 9 is guided in the first rotation range of the wheel 5 on the first guideway 11.

Preferably, the rotation range is a rotation angle of the wheel 5. The range of rotation or the rotation angle is preferably smaller than a full revolution of the wheel 5, in particular smaller than 360 degrees.

Preferably, the first rotation range is the rotation angle of the wheel 5 in which the first clamping element 7 is guided on the first guideway 11.

Preferably, the first rotation range of the wheel 5 is a maximum of 140 degrees, especially preferably a maximum of 120 degrees, in particular a maximum of 100 degrees.

Preferably, the first rotation range of the wheel 5 is at least 40 degrees, especially preferably at least 60, in particular at least 80 degrees.

Figure 1:
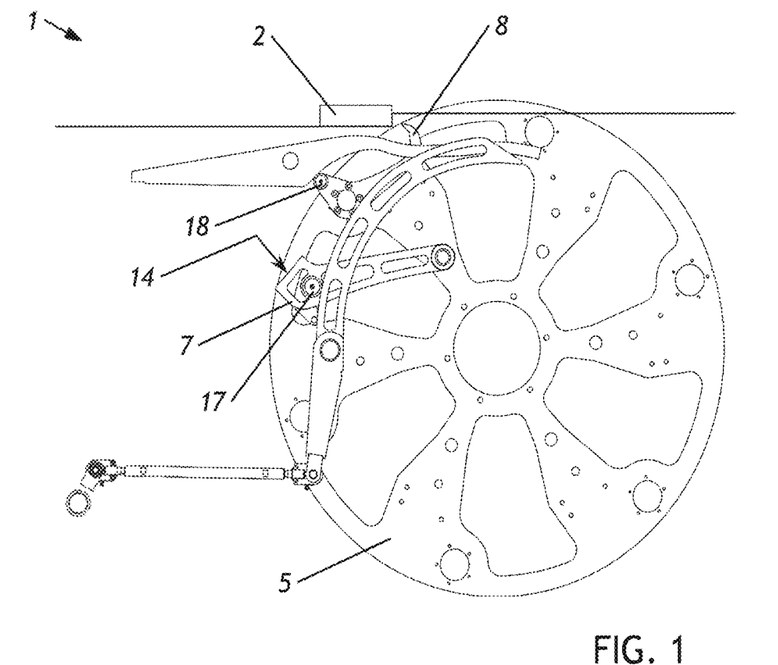
FIG. 1 shows at least portions of a preferred embodiment of a feeder in a first position.
Figure 2:
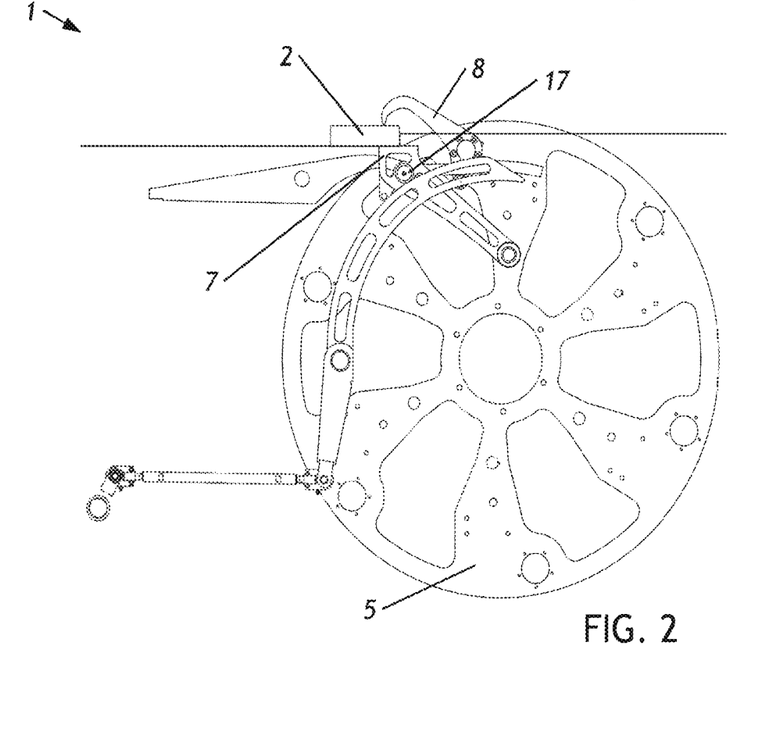
FIG. 2 shows the portions of the preferred embodiment of the feeder shown in FIG. 1 in a second position.
Figure 4:
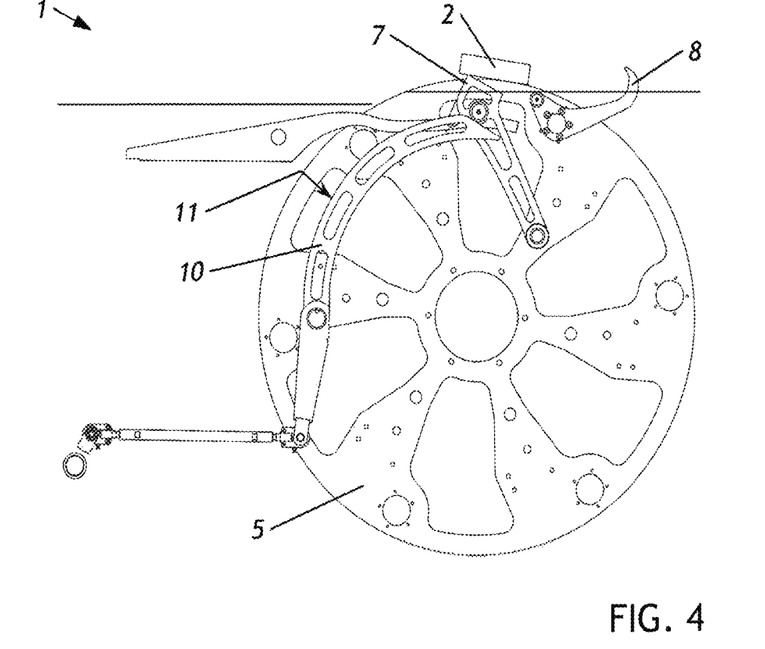
FIG. 4 shows the portions of the preferred embodiment of the feeder shown in FIG. 1 in a fourth position.
Figure 5:
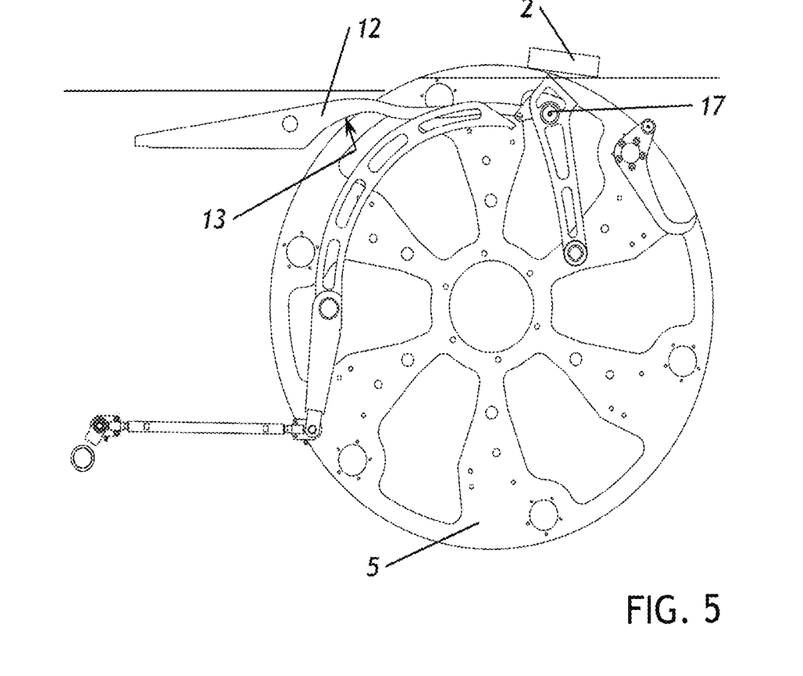
FIG. 5 shows the portions of the preferred embodiment of the feeder shown in FIG. 1 in a fifth position.

Preferably, the first clamping element 7 can comprise a first roller 17, which first roller 17 is guided on the first guide 10, in particular on the first guideway 11. In FIG. 1, a first position of the preferred embodiment of the feeder 1 is shown by way of example. It can be seen that the first roller 17 is in contact with a beginning of the first guideway 11 and is guided along the first guideway 11. FIG. 2 shows a second position of the preferred embodiment of the feeder 1 by way of example, the guiding of the first roller 17 on the first guideway 11 resulting in the first clamping element 7 coming into contact with the sawn wood piece 2. FIG. 4 shows a fourth position of the preferred embodiment of the feeder 1 by way of example in which the first roller 17 has reached one end of the first guideway 11 and the sawn wood piece 2 is released from the clamped state. FIG. 5 shows a fifth position of the preferred embodiment of the feeder 1 by way of example in which the first roller 17 is no longer guided on the first guideway 11 and the first rotation range has been left.

Preferably, the first rotation range is the rotation angle of the wheel 5 in which the first roller 17 is guided on the first guideway 11.

Preferably, a provision can be made that the control device comprises a second guide 12 with a second guideway 13 and that the second clamping element 8 for clamping the sawn wood piece 2 in the conveying region 9 is guided on the second guideway 13 in a second rotation region of the wheel 5. This offers the advantage that a quick adjustment of the clamping of the sawn wood pieces 2 in place between the first and the second clamping element 7, 8 can be achieved. This makes it possible to control a clamping movement of the first and the second clamping element 7, 8 with maximum simultaneity, whereby an especially controlled transfer of the sawn wood pieces 2 in a cycle-based conveying process can be achieved.

Preferably, the second rotation range is the rotation angle of the wheel 5 in which the second clamping element 8 is guided on the second guideway 13.

Preferably, the second rotation range of the wheel 5 is a maximum of 120 degrees, especially preferably a maximum of 100 degrees, in particular a maximum of 80 degrees.

Preferably, the second rotation range of the wheel 5 is at least 40 degrees, especially preferably at least 60, in particular at least 80 degrees.

Figure 3:
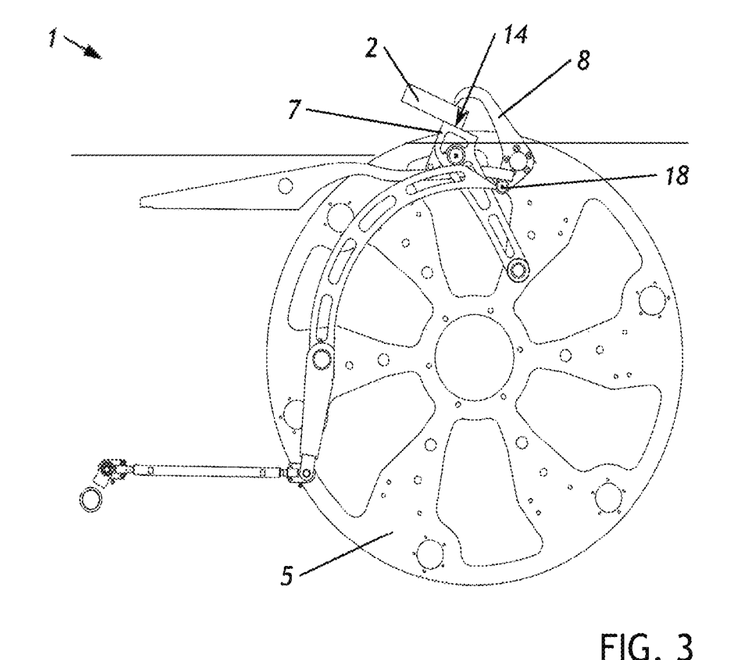
FIG. 3 shows the portions of the preferred embodiment of the feeder shown in FIG. 1 in a third position.

Preferably, the second clamping element 8 can comprise a second roller 18, which second roller 18 is guided on the second guide 12, in particular on the second guideway 13. FIG. 1 shows the first position of the preferred embodiment of the feeder 1 by way of example in which the second roller 18 is in contact with a beginning of the second guideway 13 and the latter is guided. FIG. 2 shows a second position of the preferred embodiment of the feeder 1 by way of example in which the guiding of the second roller 18 on the second guideway 13 results in the second clamping element 8 coming into contact with the sawn wood piece 2 and the sawn wood piece 2 being clamped in place between the first and the second clamping element 7, 8. FIG. 3 shows a third position of the preferred embodiment of the feeder 1 by way of example in which the second roller 18 has reached one end of the second guideway 13. FIG. 4 shows the fifth position of the preferred embodiment of the feeder 1 by way of example in which the second roller 18 is no longer guided on the second guideway 13 and the second rotation range has been left.

Preferably, the second rotation range is the rotation angle of the wheel 5 in which the second roller 18 is guided on the second guideway 13.

Preferably, the clamping force for clamping the sawn wood piece 2 for the first and second clamping elements 7, 8 can be generated by guiding the first and second clamping elements 7, 8 on the first and second guideways 11, 13.

Preferably, a provision can be made that the control device comprises a control unit for controlling the first and the second guide 10, 12, particularly for the purpose of controlling the orientation and the position of the first and the second guideway 11, 13. Preferably, the control unit can also be referred to as a controller.

Preferably, a provision can be made that the first and/or second guide 10, 12 of the control device is pneumatically controlled.

Preferably, the control device can comprise a motor for controlling the first and/or second guide 10, 13. Preferably, the control unit can control the motor of the control device.

Preferably, the feeder 1 can comprise pneumatic cylinders attached to the wheel 5 for resetting the first and/or second clamping elements 7, 8. A provision can be preferably made that the pneumatic cylinders are brought into an extended state as a result of the clamping of the sawn wood piece 2 and are returned to a retracted state through application of pressure. This return to the retracted state can be referred to as resetting the first and/or second clamping element 7, 8.

Alternatively, resetting of the first and/or second clamping elements 7, 8 can also be carried out by means of springs for the first and/or second clamping elements 7, 8 instead of with pneumatic cylinders.

Preferably, the control device can be designed to control the first clamping element 7 and the second clamping element 8 in such a way that a time difference between the time of contact of the first clamping element 7 with the sawn wood piece 2 and the time of contact of the second clamping element 8 with the sawn wood piece 2 is as small as possible. Preferably, the first clamping element 7 and the second clamping element 8 can contact the sawn wood piece 2 substantially simultaneously. This enables an especially smooth and controlled clamping of the sawn wood piece 2 between the first and second clamping elements 7, 8 to be achieved.

Preferably, the time difference between the time of contact of the first clamping element 7 with the sawn wood piece 2 and the time of contact of the second clamping element 8 with the sawn wood piece 2 can be less than 500 milliseconds, especially preferably less than 100 milliseconds, in particular less than 10 milliseconds.

Preferably, a provision can be made that the first clamping element 7 comprises a substantially flat clamping surface 14 for clamping the sawn wood piece 2. FIG. 3 shows the third position of the preferred embodiment of the feeder 1 by way of example in which the sawn wood piece 2 clamped between the clamping surface 14 of the first clamping element 7 and the second clamping element 8 is shown by way of example. This offers the advantage that an especially controlled carrying of the sawn wood piece 2 by the first clamping element 7 can be achieved, because especially good clamping of the sawn wood piece 2 between the first and the second clamping element 7, 8 can be achieved.

Preferably, a provision can be made that the first clamping element 7 and/or the second clamping element 8 is embodied as an arm and that a pivoting movement of the arm is predetermined by the control device. This offers the advantage of enabling especially simple and low-maintenance construction of the clamping elements 7, 8 to be achieved.

Preferably, the arm of the first and/or second clamping element 7, 8 can extend away from the attachment of the first and/or second clamping element 7, 8 to the wheel 5.

Preferably, the first guide 10, in particular the first guideway 11, and/or the second guide 12, in particular the second guideway 13, can specify the pivoting movement of the arm of the first clamping element 7 and/or the second clamping element 8.

Preferably, a provision can be made that the second clamping element 8, in particular the arm of the second clamping element 8, is hook-shaped. Such a hook-shaped design of the second clamping element 8 is shown for the sake of example in FIGS. 1 to 7. This offers the advantage that differently dimensioned sawn wood can be clamped between the first and second clamping elements 7, 8 without any modifications to the feeder 1.

Preferably, the first roller 17 can be attached to the first clamping element 7 between the clamping surface 14 and the attachment of the first clamping element 7 to the wheel 5.

Preferably, the second clamping element 8 can comprise an extension, in which case the second roller 18 is fastened to the extension. Preferably, the extension can extend away from the attachment of the second clamping element 8 to the wheel 5.

Preferably, the extension and the arm of the second clamping element 8 can extend in different directions away from the attachment of the second clamping element 8 to the wheel 5.

Preferably, a provision can be made that a plurality of first clamping elements 7 and a plurality of second clamping elements 8 are fastened to the wheel 5 and that the first clamping elements 7 are each guided in the first rotational range of the wheel 5 on the first guideway 11 and the second clamping elements 8 are each guided in the second rotational range of the wheel 5 on the second guideway 13. This offers the advantage that the highest possible cycle rate can be achieved for the controlled transfer of sawn wood pieces 2 from an asynchronous conveyor to a synchronous conveyor.

If the feeder 1 comprises more than one wheel 5, a provision can be preferably made that a plurality of first clamping elements 7 and a plurality of second clamping elements 8 are attached to each wheel 5.

Preferably, a provision can be made that at least one flight 16 of the drag conveyor 4 moves in a delivery region of the conveying region 9 at a flight speed and that the first clamping element 7 and the second clamping element 8 release the sawn wood piece 2 from the clamped state into the delivery region. This offers the advantage that the sawn wood pieces 2 can be transferred directly to the drag conveyor 4, enabling a substantially faster and more controlled transfer of the sawn wood pieces 2 to the drag conveyor 4 to be achieved even in the case of heavily deformed boards. As a result, the number of misalignments after delivery to the drag conveyor 4, i.e., the movement of a sawn wood piece 2 which undergoes a rotation in addition to translation during conveyance, can be substantially reduced. This makes it possible to achieve maximally trouble-free operation even when different qualities of sawn wood pieces 2 are used during feeding.

Preferably, a provision can be made that the accumulating conveyor 3 comprises a movable accumulating conveyor retaining device in a pick-up region of the conveying region 9. This offers the advantage that the sawn wood pieces 2 can rest at a predetermined position, enabling the sawn wood pieces 2 to be quickly and easily clamped between the first and the second clamping element 7, 8.

Preferably, the retaining device can be embodied as a hook or as a step-shaped elevation. Preferably, the accumulation retention device is the stop in the conveying region 9 up to which the accumulating conveyor 3 transports the sawn wood pieces 2. In FIG. 1, the sawn wood piece 2 is shown as an example, retained on a stepped elevation.

Preferably, the accumulating conveyor retaining device can form a predeterminably removable stop for the accumulating conveyor 3.

Preferably, the sawn wood piece 2 is transported by the accumulating conveyor 3 until it reaches the accumulation retaining device. Then, this sawn wood piece 2 is preferably clamped by the feeder 1, and the accumulation retaining device is moved away from a retaining position, the accumulation retaining device releasing the clamped sawn wood piece 2, which is then transported away by the feeder 1. Thereafter, the accumulation retention device is moved back into the retaining position in order to retain subsequent sawn wood pieces 2 of the accumulating conveyor 3.

Alternatively, the accumulating conveyor 3 can preferably have a fixed stop, in which case the feeder 1 lifts the sawn wood piece 2 over the fixed stop.

Preferably, a provision can be made that the accumulating conveyor 3 comprises a sensor that is operatively connected to the feeder 1 in order to measure the thickness of the sawn wood piece 2, and that the control device takes the measured thickness of the sawn wood piece 2 into account when controlling the first and second clamping elements 7, 8. This offers the advantage that the clamping between the first and the second clamping element 7, 8 can be adapted in an especially quick and easy manner to sawn wood pieces 2 of different thicknesses.

Preferably, the sensor can be part of a sensor system. Preferably, the sensor system can comprise a light barrier system. Preferably, the sensor system can be connected to the control device, in which case the control device can be designed to carry out a clamping movement of the first and second clamping elements 7, 8 only when a sawn wood piece 2 is detected by the sensor system in the pick-up region.

Preferably, a provision can be made that a flight 16 of the drag conveyor 4 moves in a delivery region of the conveying region 9 at a flight speed, that the sawn wood piece 2 in the clamped state is accelerated substantially to the flight speed, and that the sawn wood piece 2 is released by the first clamping element 7 and the second clamping element 8 from the clamped state into the delivery region. This offers the advantage that the sawn wood pieces 2 can be transferred directly to the drag conveyor 4, enabling a substantially faster and more controlled transfer of sawn wood pieces 2 to the drag conveyor 4 to be achieved even in the case of heavily deformed boards. This can substantially reduce the number of misalignments. This makes it possible to achieve maximally trouble-free operation even when different qualities of sawn wood pieces 2 are used during feeding.

Preferably, a provision can be made that the control device takes into account a thickness of the sawn wood piece 2 when controlling the first and second clamping elements 7, 8. This offers the advantage that the sawn wood pieces 2 can be clamped in an especially controlled manner between the first and the second clamping element 7, 8.

Preferably, the thickness of the sawn wood piece 2 can be measured before feeding the sawn wood piece 2 to the accumulating conveyor 3. Preferably, the measured thickness of the sawn wood piece 2 can be specified to the control device. In that case, when feeding sawn wood pieces 2 with the same thickness, the thickness of one sawn wood piece 2 can be advantageously measured only once, it being possible for the feeder 1 to be adjusted to the measured thickness of the sawn wood piece 2. As a result, for example, a first batch of sawn wood pieces 2 with a first thickness can be fed to the accumulating conveyor 3, the first thickness being specified to the control device or fed into the control unit and the control device taking the first thickness into account when clamping the sawn wood pieces 2 of the first batch. Subsequently, a second batch of sawn wood pieces 2 with a second thickness can be fed to the accumulating conveyor 3, the second thickness being specified for the accumulating conveyor 3 or fed into the control unit and the control device taking the second thickness into account when clamping the sawn wood pieces of the second batch.

Preferably, a provision can be made that the thickness of the sawn wood piece 2 is measured by a sensor of the accumulating conveyor 3 that is operatively connected to the feeder 1. This offers the advantage that the clamping between the first and the second clamping element 7, 8 can be adapted in an especially quick and easy manner to sawn wood pieces 2 of different thicknesses.

The following are principles for understanding and interpreting the present disclosure.

Features are usually introduced with an indefinite article "a, an, one." Unless the context indicates otherwise, "a, an, one" should not be understood as constituting a numeral.

The connecting word "or" is to be interpreted as inclusive and not exclusive. Unless the context indicates otherwise, "A or B" also includes "A and B", where "A" and "B" represent any arbitrary features.

Insofar as not otherwise established by the disclosure of the invention, a feature X and an object Y are differentiated in multiple embodiments by means of an ordinal number such as "first," "second," or "third." In particular, a feature X or object Y with an ordinal number in a claim does not mean that an embodiment of the invention falling under this claim must have an additional feature X or an additional object Y.

The word "substantially" in connection with a numerical value includes a tolerance of ±10% around the specified numerical value, insofar as not otherwise indicated by the context.

For value ranges, the end points are included insofar as not otherwise indicated by the context.

The invention claimed is:

1. A feeder for feeding sawn wood pieces from an accumulating conveyor to a drag conveyor, comprising:
   at least one wheel with an axis of rotation; and
   at least one control device;
   wherein a plurality of first clamping elements and a plurality of second clamping elements are fastened to the wheel;
   wherein the feeder is designed to clamp a sawn wood piece in place in a conveying region between the first and the second clamping element when the wheel rotates and to transport it in a clamped state along the conveying region;
   wherein the control device is designed to control the first clamping element independently of the second clamping element;
   wherein the control device comprises a first guide with a first guideway and wherein the first clamping element for clamping the sawn wood piece in place in the conveying region is guided on the first guideway in a first rotation range of the wheel; and
   wherein the control device comprises a second guide with a second guideway and that the second clamping element for clamping the sawn wood piece in place in the conveying region is guided on the second guideway in a second rotation range of the wheel;
   wherein the control device comprises a control unit for controlling the orientation and the position of the first and the second guideways; and
   wherein the first clamping elements are each guided on the first guideway in the first rotation range of the wheel and the second clamping elements are each guided on the second guideway in the second rotation range of the wheel.

2. The feeder according to claim 1, wherein the first rotation range of the wheel is a maximum of 140 degrees.

3. The feeder according to claim 1, wherein the first rotation range of the wheel is a maximum of 120 degrees.

4. The feeder according to claim 1, wherein the first rotation range of the wheel is a maximum of 100 degrees.

5. The feeder according to claim 1, wherein the second rotation range of the wheel is a maximum of 120 degrees.

6. The feeder according to claim 1, wherein the second rotation range of the wheel is a maximum of 100 degrees.

7. The feeder according to claim 1, wherein the second rotation range of the wheel is a maximum of 80 degrees.

8. The feeder according to claim 1, wherein the first clamping element comprises a first roller, the first roller being guided on the first guideway.

9. The feeder according to claim 1, wherein the second clamping element comprises a second roller, the second roller being guided on the second guideway.

10. The feeder according to claim 1, wherein the first clamping element comprises a substantially flat clamping surface for clamping the sawn wood piece.

11. The feeder according to claim 1, wherein:
at least one of the first clamping element and the second clamping element comprises an arm and a pivoting movement of the arm is predetermined by the control device.

12. A feeding system comprising:
an accumulating conveyor;
a drag conveyor; and
a feeder arranged between the accumulating conveyor and the drag conveyor, the feeder configured to transport a sawn wood piece from the accumulating conveyor to the drag conveyor, the feeder comprising:
at least one wheel with an axis of rotation; and
at least one control device;
wherein a plurality of first clamping elements and a plurality of second clamping elements are fastened to the wheel;
wherein the feeder is designed to clamp a sawn wood piece in place in a conveying region between the first and the second clamping element when the wheel rotates and to transport it in a clamped state along the conveying region;
wherein the control device is designed to control the first clamping element independently of the second clamping element;
wherein the control device comprises a first guide with a first guideway and wherein the first clamping element for clamping the sawn wood piece in place in the conveying region is guided on the first guideway in a first rotation range of the wheel; and
wherein the control device comprises a second guide with a second guideway and that the second clamping element for clamping the sawn wood piece in place in the conveying region is guided on the second guideway in a second rotation range of the wheel;
wherein the control device comprises a control unit for controlling the orientation and the position of the first and the second guideways; and
wherein the first clamping elements are each guided on the first guideway in the first rotation range of the wheel and the second clamping elements are each guided on the second guideway in the second rotation range of the wheel.

13. The feeding system according to claim 12, wherein:
at least one flight of the drag conveyor moves in a delivery region of the conveying region at a flight speed; and
the first clamping element and the second clamping element release the sawn wood piece from the clamped state into the delivery region.

14. The feeding system according to claim 12, wherein the accumulating conveyor comprises a movable accumulating conveyor retaining device in a pick-up region of the conveying region.

15. The feeding system according to claim 12, wherein:
the accumulating conveyor comprises a sensor operatively connected to the feeder for measuring the thickness of the sawn wood piece; and
the control device controls the first and second clamping elements based on the measured thickness of the sawn wood piece.

16. A method for feeding sawn wood pieces from an accumulating conveyor to a drag conveyor with a feeder, comprising:
providing the feeder, the feeder comprising at least one wheel with an axis of rotation and at least one control device, a plurality of first clamping elements and a plurality of second clamping elements being fastened to the wheel;
wherein, when the wheel rotates, a sawn wood piece is clamped in a pick-up region of a conveying region between the first clamping element and the second clamping element and is transported in a clamped state along the conveying region;
wherein the first clamping element is controlled independently of the second clamping element by the control device, wherein the control device comprises a first guide with a first guideway;
wherein the first clamping element for clamping the sawn wood piece in the conveying region in a first rotation range of the wheel is guided on the first guideway;
wherein the control device comprises a second guide with a second guideway and that the second clamping element for clamping the sawn wood piece in the conveying region is guided on the second guideway in a second rotation range of the wheel;
wherein the orientation and position of the first and second guideways are controlled by means of a control unit of the control device; and
wherein the first clamping elements are each guided on the first guideway in the first rotation range of the wheel and the second clamping elements are each guided on the second guideway in the second rotation range of the wheel.

17. The method according to claim 16, wherein a flight of the drag conveyor moves in a delivery region of the conveying region at a flight speed, that the sawn wood piece in the clamped state is accelerated substantially to the flight speed, and that the sawn wood piece is released by the first clamping element and the second clamping element from the clamped state into the delivery region.

18. The method according to claim 16, wherein the control device takes into account a thickness of the sawn wood piece when controlling the first and the second clamping element.

19. The method according to claim 18, wherein the thickness of the sawn wood piece is measured by a sensor of the accumulating conveyor that is operatively connected to the feeder.

* * * * *